United States Patent [19]

Bourland

[11] 4,371,666
[45] Feb. 1, 1983

[54] COMPATIBLE BLENDS OF CHLORINATED POLYVINYL CHLORIDE RESINS AND STYRENE-MALEIC ANHYDRIDE RESINS

[75] Inventor: Larry G. Bourland, Downington, Pa.

[73] Assignee: Atlantic Richfield Company, Los Angeles, Calif.

[21] Appl. No.: 293,562

[22] Filed: Aug. 17, 1981

[51] Int. Cl.³ ..................... C08L 25/08; C08L 27/24
[52] U.S. Cl. ..................... 525/207; 525/192
[58] Field of Search ..................... 525/207, 192

[56] References Cited

U.S. PATENT DOCUMENTS

| | | | |
|---|---|---|---|
| 3,626,033 | 12/1971 | Keskkula et al. | 525/207 |
| 3,632,839 | 1/1972 | Young et al. | 525/192 |
| 3,720,734 | 3/1973 | Kopacki et al. | 525/207 |
| 4,151,218 | 4/1979 | Lee | 525/207 |

Primary Examiner—Carman J. Seccuro

[57] ABSTRACT

A flame retardant blend of thermoplastic polymers comprises a blend of 1–99 percent by weight of a chlorinated polyvinyl chloride resin and 1–99 percent by weight of a copolymer of styrene and an ethylenically unsaturated dicarboxylic acid monomer, the blend having a heat distortion temperature in excess of 200° F., and a single glass transition property. Such blends which contain at least 40 percent by weight of said chlorinated polyvinyl chloride resin and an oxygen index of at least 0.25 also exhibit flame retardant properties.

11 Claims, No Drawings

COMPATIBLE BLENDS OF CHLORINATED POLYVINYL CHLORIDE RESINS AND STYRENE-MALEIC ANHYDRIDE RESINS

BACKGROUND OF THE INVENTION

The present invention provides blends of other thermoplastic resins that exhibit compatibility and have high heat distortion temperatures, which blends are formed from chlorinated polyvinyl chloride resins and styrene-maleic anhydride resins. Where the chlorinated polyvinyl chloride resin is present in the blend in an amount of forty percent or more, and the blend exhibits an oxygen index of at least 0.25, flame retardancy is also exhibited by the blends.

The formation of various blends of other thermoplastic compositions to produce a product which has beneficial properties for specific end uses has been effected. In such end uses, some properties of specific importance can be a high heat distortion temperature, as well as flame retardancy. Some such blends evidence compatibility over various ranges of respective resins, while some blends are not compatible with each other except under specific conditions. The present thermoplastic blend provides a product which is fully compatible and which is usable in applications where a high heat distortion temperature is required, and some of the products exhibit flame retardancy. In the formation of thermoplastic siding for use as a building covering, for example, such products may be used which have flame retardancy, as well as high heat distortion temperature, i.e., a heat distortion temperature in excess of about 200° F.

The formation of blends of polyvinyl chloride resins has been previously taught, for example, in U.S. Pat. No. 3,626,033, which teaches the formation of ternary blends of a polyvinyl chloride resin, a polydiene rubber nitrile graft copolymer and an alkenyl aromatic/unsaturated anhydride copolymer. The formation, however, of blends of a chlorinated polyvinyl chloride resin and a styrene-maleic anhydride resin to form the present blends is not taught or suggested therein.

SUMMARY OF THE INVENTION

A compatible blend of thermoplastic polymers, having a high heat distortion temperature, is formed by intimately mixing from 1-99 percent by weight of a chlorinated polyvinyl chloride resin and 1-99 percent by weight of a copolymer consisting of a vinyl aromatic monomer, such as styrene, and an ethylenically unsaturated dicarboxylic acid monomer, such as maleic anhydride, whereby the resultant blend has a heat distortion temperature in excess of 200° F., and the blend exhibits a single glass transition (Tg) temperature. The compatible blends are rendered flame retardant where the blend contains about 40-99 percent by weight of chlorinated polyvinyl chloride and 1-60 percent by weight of the copolymer, and the blend exhibits an oxygen index of at least 0.25.

DETAILED DESCRIPTION

The present invention relates to blends of specific thermoplastic polymers, a chlorinated polyvinyl chloride resin, and a copolymer of a vinyl aromatic monomer and an ethylenically unsaturated dicarboxylic acid monomer, which blends exhibit complete compatibility and heat resistance properties, with some blends exhibiting flame retardancy.

The present blend of thermoplastic polymers contains between 1-99 percent, by weight of the blend composition, of a chlorinated polyvinyl chloride resin. The chlorinated polyvinyl chloride resin may comprise a chlorinated homopolymer of vinyl chloride, or a chlorinated copolymer of vinyl chloride and up to about 10 percent by weight of a copolymerizable olefinically unsaturated comonomer such as a vinylidene chloride, vinyl acetate, acylic acid, methyl methacrylate, ethylene, propylene or the like. The chlorinated polyvinyl chloride resin must, however, be chlorinated in such a manner that the chlorine content of the resin is in excess of the chlorine content of a conventional polyvinyl chloride resin.

To the chlorinated polyvinyl chloride resin there is added from 1-99 percent, by weight of the blend composition, of a copolymer of a vinyl aromatic monomer and an ethylenically unsaturated dicarboxylic acid monomer. The preferred vinyl aromatic monomer is styrene, chlorostyrene vinyltoluene containing predominantly p-methylstyrene, or tert-butylstyrene, although others would include other nuclear substituted methylstyrenes, alpha-methylstrene, dichloro-styrene and the like. The term "acid monomer" as used herein is meant to include an ethylenically unsaturated dicarboxylic acid, its anhydride, or a half ester derivative of such a dicarboxylic acid or mixtures thereof. Suitable acids and their derivatives useful in the present invention are maleic acid, fumaric acid, itaconic acid, citraconic acid, mesaconic acid, ethyl maleic acid, methyl itaconic acid, chloromaleic acid, dichloromaleic acid, bromomaleic acid, dibromomaleic acid and the like, the anhydrides of these acids, or the half esters of these with suitable alcohols. The alcohols used may be the primary and secondary alkanols containing up to 6 carbon atoms, such as, methyl alcohol, ethyl alcohol, n-propyl alcohol, n-butyl alcohol, secbutyl alcohol, and n-pentyl alcohol; halogenated alkanols having up to 6 carbon atoms, such as 2,3-dichloro-1-propanol, and 2-bromo-1-propanol; arylalkyl alcohols, such as benzyl alcohol; cyclic alcohols having up to 6 carbon atoms, such as cyclopentanol, cyclohexanol and tetrahydrofurfuryl alcohol; ether alcohols, such as 2-butoxyethanol and the ethyl ether of diethylene glycol, and the like. The acid monomer units in the copolymer are distributed somewhat at random along the copolymer chain. The weight percent of acid monomer present in the copolymer should be between about 8 to 30 percent by weight of the vinyl aromatic-acid monomer copolymer composition. Such styrene-acid monomer copolymers are known compositions, generally prepared by reacting acid monomer and styrene at elevated temperatures in the presence of preoxide catalysts. Such copolymers are, for example, described in U.S. Pat. No. 2,769,804; 2,866,771; 2,971,939; 3,336,267; and 3,919,354. The copolymer will have a weight-average molecular weight of at least 140,000 and more preferably at least 200,000. Melt flow (condition L, grams/10 minutes) is typically between about 0.20 and 10, and is somewhat dependent on the copolymer type. Preferably, the styrene copolymer will comprise about 10 to 25 percent by weight of acid monomer.

In applications where it is desired to impart flame retardancy to the blends, the blends will contain between 40-99 percent by weight of the blend composition, of said chlorinated polyvinyl chloride resin and between 1-60 percent, by weight of the blend composition, of said copolymer of a vinyl aromatic monomer and ethylenically unsaturated dicarboxylic acid monomer.

The flame retardancy of the present blends is determined by evaluating the limiting oxygen index (O.I.) of the blends by the procedure of ASTM D 2863, with an oxygen index value of 0.25 or greater indicating acceptable flame retardancy, while the heat distortion temperature is determined by ANSI/ASTM D 648-72 (Reapproved 1978).

The chlorinated polyvinyl chloride resin and styrene-acid monomer copolymer may be blended, in the prescribed amounts, by mechanically working the two components at a temperature high enough such that the mass is plasticized, for example by milling on a roll or an internal mixer such as a Banbury mixer. In order to obtain a homogeneous blend the mixing equipment must provide a high shear. Compounding rolls, mixing extruders, Banbury mixers, plastographs, high intensity mixers, etc. are all suitable for preparing the blends at temperatures suitable to heat plastify the components.

Upon mixing, the blends of the present invention are compatible in all proportions as evidenced by single transition (Tg) in Differential Scanning Calorimetry. In determining the Tg, the same was measured by heating the blend at 20° C./min. to 190° C. then cooling the same at 20° C./min. to room temperature as a preconditioning step. The blends were then heated at 20° C./min. and the Tg was determined by Differential Scanning Calorimetry. The single transition for each blend was intermediate between transitions of pure component resins.

As an indication of the properties of blends formed in accordance with the present invention, the intimate mixing of a chlorinated polyvinyl chloride resin (CPVC) (Geon CPVC 3010 by B. F. Goodrich Co., containing a chlorine content of about 64 weight percent) and a styrene-maleic anhydride (SMA) copolymer containing 14 percent by weight of maleic anhydride, in the amounts by weight listed in the following Table I gave the following properties:

TABLE I

| Percent by Weight CPVC/SMA | DTUL[1] (°F.) | Tg[2] (°C.) | Oxygen Index[3] |
|---|---|---|---|
| 100/0 | 203 | 112.5 | 0.60 |
| 95/5 | 205.5 | * | 0.51 |
| 90/10 | 206.5 | 114 | 0.45 |
| 80/20 | 208.5 | 114 | 0.35 |
| 40/60 | 220 | 123 | 0.25 |
| 20/80 | 226.5 | 124.5 | 0.22 |
| 10/90 | 229 | 126 | 0.21 |
| 5/95 | 229.5 | 126 | 0.21 |
| 0/100 | 234 | 130 | 0.20 |

[1]DTUL: according to ANSI/ASTM D 648-72 (Reapproved 1978)
[2]Tg: according to Differential Scanning Calorimetry
[3]O.I.: limited oxygen index according to ASTM D 2863
*not determined As is seen by the results listed in Table I, the blends are compatible in all proportions, evidencing a single Tg by Differential Scanning Calorimetry, and high heat distortion temperatures in excess of 200° F. Also, where at least about 40 percent by weight of the chlorinated polyvinyl chloride resin is present in the blend, in addition to the above properties the blends exhibit an oxygen index value of greater than 0.25 and flame retardancy.

Blends which contain a chlorinated polyvinyl chloride resin and the requisite amount of a styrene-maleic anhydride copolymer containing from 8-30 percent, preferably 10-25 percent, by weight of maleic anhydride would exhibit comparable properties.

I claim:

1. A compatible blend of thermoplastic polymers consisting assentially of: (a) from 1-99 percent by weight of a chlorinated polyvinyl chloride resin; and (b) from 1-99 percent by weight of a copolymer consisting of a vinyl aromatic monomer and an ethylenically unsaturated dicarboxylic acid monomer; said blend having a heat distortion temperature in excesss of 200° F., and a single glass transition property.

2. A compatible blend of thermoplastic polymers as defined in claim 1 wherein said vinyl aromatic monomer is selected from the group consisting of styrene, vinyltoluene, chlorostyrene or tert-butylstyrene.

3. A compatible blend of thermoplastic polymers as defined in claim 1 wherein said ethylenically unsaturated dicarboxylic acid monomer is selected from the group consisting of ethylenically unsaturated dicarboxylic acids, ethylenically unsaturated dicarboxylic acid anhydrides, ethylenically unsaturated dicarboxylic acid half esters, and mixtures thereof.

4. A compatible blend of thermoplastic polymers as defined in claim 1 wherein said copolymer is a copolymer of styrene and maleic anhydride, said copolymer containing between about 8-30 percent by weight of said maleic anhydride.

5. A compatible blend of thermoplastic polymers as defined in claim 1 wherein said copolymer is a copolymer of styrene and maleic anhydride, said copolymer containing between about 10-25 percent by weight of said maleic anhydride.

6. A compatible blend of thermoplastic polymers as defined in claim 1 wherein said copolymer is a copolymer containing 86 percent by weight styrene and 14 percent by weight of maleic anhydride.

7. A compatible blend of thermoplastic polymers as defined in claim 1 wherein said chlorinated polyvinyl chloride resin is present in an amount of 40-99 percent by weight; said copolymer is present in an amount of 1-60 percent by weight, and said blend has an oxygen index of at least 0.25, whereby said blend is flame retardant.

8. A compatible, flame retardant blend of thermoplastic polymers as defined in claim 7 wherein said vinyl aromatic monomer is selected from the group consisting of styrene, vinyltoluene, chlorostyrene or tert-butylstyrene.

9. A compatible, flame retardant blend of thermoplastic polymers as defined in claim 7 wherein said copolymer is a copolymer of styrene and maleic anhydride, said copolymer containing between about 8-30 percent by weight of said maleic anhydride.

10. A compatible, flame retardant blend of thermoplastic polymers as defined in claim 7 wherein said copolymer is a copolymer of styrene and maleic anhydride, said copolymer containing between about 10-25 percent by weight of said maleic anhydride.

11. A compatible, flame retardant blend of thermoplastic polymers as defined in claim 7 wherein said copolymer is a copolymer containing 86 percent by weight styrene and 14 percent by weight of maleic anydride.

* * * * *